US008279649B2

(12) United States Patent
Esram et al.

(10) Patent No.: US 8,279,649 B2
(45) Date of Patent: Oct. 2, 2012

(54) APPARATUS AND METHOD FOR CONTROLLING A POWER INVERTER

(75) Inventors: Trishan Esram, Kennewick, IL (US); Alexander Gray, Champaign, IL (US); Eric Martina, Houston, TX (US); Patrick L. Chapman, Urbana, IL (US)

(73) Assignee: SolarBridge Technologies, Inc., Austin, TX (US)

( * ) Notice: Subject to any disclaimer, the term of this patent is extended or adjusted under 35 U.S.C. 154(b) by 173 days.

(21) Appl. No.: 12/902,083

(22) Filed: Oct. 11, 2010

(65) Prior Publication Data

US 2012/0087165 A1  Apr. 12, 2012

(51) Int. Cl.
H02M 7/5387 (2007.01)

(52) U.S. Cl. ............................... 363/132; 700/291

(58) Field of Classification Search ............ 363/95, 363/132, 17; 700/286, 291, 298
See application file for complete search history.

(56) References Cited

U.S. PATENT DOCUMENTS

| 3,670,230 A | 6/1972 | Rooney et al. |
| 4,114,048 A | 9/1978 | Hull |
| 4,217,633 A | 8/1980 | Evans |
| 4,277,692 A | 7/1981 | Small |
| 4,287,465 A | 9/1981 | Godard et al. |
| 4,651,265 A | 3/1987 | Stacey et al. |
| 4,661,758 A | 4/1987 | Whittaker |
| 4,707,774 A | 11/1987 | Kajita |
| 4,709,318 A | 11/1987 | Gephart et al. |
| 4,719,550 A | 1/1988 | Powell et al. |
| 4,725,740 A | 2/1988 | Nakata |
| 5,041,959 A | 8/1991 | Walker |
| 5,148,043 A | 9/1992 | Hirata et al. |
| 5,160,851 A | 11/1992 | McAndrews |
| 5,191,519 A | 3/1993 | Kawakami |
| 5,309,073 A | 5/1994 | Kaneko et al. |
| 5,343,380 A | 8/1994 | Champlin |
| 5,473,528 A | 12/1995 | Hirata |
| 5,668,464 A | 9/1997 | Krein |
| 5,684,385 A | 11/1997 | Guyonneau et al. |

(Continued)

FOREIGN PATENT DOCUMENTS

CA  2353422 C  3/2004

(Continued)

OTHER PUBLICATIONS

Kutkut, "PV Energy Conversion and System Integration," Florida Energy Systems Consortium, 2009, 24 pages.

(Continued)

*Primary Examiner* — Shawn Riley
(74) *Attorney, Agent, or Firm* — Barnes & Thornburg LLP

(57) ABSTRACT

An apparatus and method for controlling a DC-to-AC inverter is disclosed. The DC-to-AC inverter may be configured to convert DC power received from an alternative energy source to AC power for supplying an AC grid or load. The inverter may determine whether the power presently supplied by the alternative energy source is less than a predetermined amount of power and, if so, disable an output converter of the inverter. Additionally, the inverter may predict the voltage of a DC bus of the inverter at a future point in time and, if the predicted DC bus voltage is greater than a predetermined maximum DC bus voltage, enable the output converter to transfer energy from the DC bus to the AC grid to reduce the DC bus voltage.

28 Claims, 8 Drawing Sheets

U.S. PATENT DOCUMENTS

| | | | |
|---|---|---|---|
| 5,721,481 | A | 2/1998 | Narita et al. |
| 5,745,356 | A | 4/1998 | Tassitino |
| 5,796,182 | A | 8/1998 | Martin |
| 5,801,519 | A | 9/1998 | Midya et al. |
| 5,886,890 | A | 3/1999 | Ishida et al. |
| 5,929,537 | A | 7/1999 | Glennon |
| 5,978,236 | A | 11/1999 | Faberman et al. |
| 5,982,645 | A | 11/1999 | Levran et al. |
| 6,046,402 | A | 4/2000 | More |
| 6,154,379 | A | 11/2000 | Okita |
| 6,157,168 | A | 12/2000 | Malik |
| 6,180,868 | B1 | 1/2001 | Yoshino et al. |
| 6,201,180 | B1 | 3/2001 | Meyer et al. |
| 6,201,319 | B1 | 3/2001 | Simonelli et al. |
| 6,225,708 | B1 | 5/2001 | Furukawa |
| 6,268,559 | B1 | 7/2001 | Yamawaki |
| 6,285,572 | B1 | 9/2001 | Onizuka et al. |
| 6,291,764 | B1 | 9/2001 | Ishida et al. |
| 6,311,279 | B1 | 10/2001 | Nguyen |
| 6,339,538 | B1 | 1/2002 | Handleman |
| 6,356,471 | B1 | 3/2002 | Fang |
| 6,369,461 | B1 | 4/2002 | Jungreis et al. |
| 6,381,157 | B2 | 4/2002 | Jensen |
| 6,445,089 | B1 | 9/2002 | Okui |
| 6,462,507 | B2 | 10/2002 | Fisher |
| 6,489,755 | B1 | 12/2002 | Boudreaux et al. |
| 6,563,234 | B2 | 5/2003 | Hasegawa et al. |
| 6,605,881 | B2 | 8/2003 | Takehara et al. |
| 6,614,132 | B2 | 9/2003 | Hockney et al. |
| 6,624,533 | B1 | 9/2003 | Swanson |
| 6,657,321 | B2 | 12/2003 | Sinha |
| 6,700,802 | B2 | 3/2004 | Ulinski et al. |
| 6,727,602 | B2 | 4/2004 | Olson |
| 6,750,391 | B2 | 6/2004 | Bower et al. |
| 6,765,315 | B2 | 7/2004 | Hammerstrom |
| 6,770,984 | B2 | 8/2004 | Pai |
| 6,795,322 | B2 | 9/2004 | Aihara et al. |
| 6,838,611 | B2 | 1/2005 | Kondo et al. |
| 6,847,196 | B2 | 1/2005 | Garabandic |
| 6,881,509 | B2 | 4/2005 | Jungreis |
| 6,882,063 | B2 | 4/2005 | Droppo et al. |
| 6,950,323 | B2 | 9/2005 | Achleitner |
| 7,031,176 | B2 | 4/2006 | Kotsopoulos et al. |
| 7,072,195 | B2 | 7/2006 | Xu |
| 7,091,707 | B2 | 8/2006 | Cutler |
| 7,193,872 | B2 | 3/2007 | Siri |
| 7,233,130 | B1 | 6/2007 | Kay |
| 7,248,946 | B2 * | 7/2007 | Bashaw et al. ............. 700/286 |
| 7,289,341 | B2 | 10/2007 | Hesterman |
| 7,319,313 | B2 | 1/2008 | Dickerson et al. |
| 7,324,361 | B2 | 1/2008 | Siri |
| 7,339,287 | B2 | 3/2008 | Jepsen et al. |
| 7,339,806 | B2 * | 3/2008 | Hsieh ............................ 363/71 |
| 7,365,998 | B2 | 4/2008 | Kumar |
| 7,405,494 | B2 | 7/2008 | Tassitino, Jr. et al. |
| 7,420,354 | B2 | 9/2008 | Cutler |
| 7,432,691 | B2 | 10/2008 | Cutler |
| 7,463,500 | B2 | 12/2008 | West |
| 7,502,697 | B2 | 3/2009 | Holmquist et al. |
| 7,521,914 | B2 | 4/2009 | Dickerson et al. |
| 7,531,993 | B2 | 5/2009 | Udrea et al. |
| 7,551,460 | B2 | 6/2009 | Lalithambika et al. |
| 7,577,005 | B2 | 8/2009 | Angerer et al. |
| 7,592,789 | B2 | 9/2009 | Jain |
| 7,609,040 | B1 | 10/2009 | Jain |
| 7,626,834 | B2 | 12/2009 | Chisenga et al. |
| 7,638,899 | B2 | 12/2009 | Tracy et al. |
| 7,646,116 | B2 | 1/2010 | Batarseh et al. |
| 7,660,139 | B2 | 2/2010 | Garabandic |
| 7,667,610 | B2 | 2/2010 | Thompson |
| 7,710,752 | B2 | 5/2010 | West |
| 7,714,463 | B2 * | 5/2010 | Su et al. ........................ 307/80 |
| 7,733,679 | B2 | 6/2010 | Luger et al. |
| 7,768,155 | B2 | 8/2010 | Fornage |
| 7,796,412 | B2 | 9/2010 | Fornage |
| RE41,965 | E | 11/2010 | West |
| 7,839,022 | B2 | 11/2010 | Wolfs |
| 7,855,906 | B2 | 12/2010 | Klodowski et al. |
| RE42,039 | E | 1/2011 | West et al. |
| 7,899,632 | B2 | 3/2011 | Fornage et al. |
| 7,916,505 | B2 | 3/2011 | Fornage |
| 2001/0043050 | A1 | 11/2001 | Fisher |
| 2002/0017822 | A1 | 2/2002 | Umemura et al. |
| 2002/0196026 | A1 | 12/2002 | Kimura et al. |
| 2004/0135436 | A1 | 7/2004 | Gilbreth et al. |
| 2005/0213272 | A1 | 9/2005 | Kobayashi |
| 2006/0067137 | A1 | 3/2006 | Udrea |
| 2006/0083039 | A1 | 4/2006 | Oliveira |
| 2007/0040539 | A1 | 2/2007 | Cutler |
| 2007/0040540 | A1 | 2/2007 | Cutler |
| 2007/0133241 | A1 | 6/2007 | Mumtaz et al. |
| 2007/0159866 | A1 | 7/2007 | Siri |
| 2007/0221267 | A1 | 9/2007 | Fornage |
| 2008/0055952 | A1 | 3/2008 | Chisenga et al. |
| 2008/0078436 | A1 | 4/2008 | Nachamkin et al. |
| 2008/0106921 | A1 | 5/2008 | Dickerson et al. |
| 2008/0203397 | A1 | 8/2008 | Amaratunga et al. |
| 2008/0266922 | A1 | 10/2008 | Mumtaz et al. |
| 2008/0272279 | A1 | 11/2008 | Thompson |
| 2008/0283118 | A1 | 11/2008 | Rotzoll et al. |
| 2008/0285317 | A1 | 11/2008 | Rotzoll |
| 2008/0304296 | A1 | 12/2008 | NadimpalliRaju et al. |
| 2009/0000654 | A1 | 1/2009 | Rotzoll et al. |
| 2009/0020151 | A1 | 1/2009 | Fornage |
| 2009/0066357 | A1 | 3/2009 | Fornage |
| 2009/0079383 | A1 | 3/2009 | Fornage et al. |
| 2009/0080226 | A1 | 3/2009 | Fornage |
| 2009/0084426 | A1 | 4/2009 | Fornage et al. |
| 2009/0086514 | A1 | 4/2009 | Fornage et al. |
| 2009/0097283 | A1 | 4/2009 | Krein et al. |
| 2009/0147554 | A1 | 6/2009 | Adest et al. |
| 2009/0184695 | A1 | 7/2009 | Mocarski |
| 2009/0200994 | A1 | 8/2009 | Fornage |
| 2009/0225574 | A1 | 9/2009 | Fornage |
| 2009/0230782 | A1 | 9/2009 | Fornage |
| 2009/0242272 | A1 | 10/2009 | Little et al. |
| 2009/0243587 | A1 | 10/2009 | Fornage |
| 2009/0244929 | A1 | 10/2009 | Fornage |
| 2009/0244939 | A1 | 10/2009 | Fornage |
| 2009/0244947 | A1 | 10/2009 | Fornage |
| 2009/0296348 | A1 | 12/2009 | Russell et al. |
| 2010/0085035 | A1 | 4/2010 | Fornage |
| 2010/0088052 | A1 | 4/2010 | Yin et al. |
| 2010/0091532 | A1 | 4/2010 | Fornage |
| 2010/0106438 | A1 | 4/2010 | Fornage |
| 2010/0139945 | A1 | 6/2010 | Dargatz |
| 2010/0157634 | A1 | 6/2010 | Yu et al. |
| 2010/0175338 | A1 | 7/2010 | Garcia Cors |
| 2010/0176771 | A1 | 7/2010 | Fieldhouse et al. |
| 2010/0181830 | A1 | 7/2010 | Fornage et al. |
| 2010/0195357 | A1 | 8/2010 | Fornage et al. |
| 2010/0214808 | A1 | 8/2010 | Rodriguez |
| 2010/0222933 | A1 | 9/2010 | Smith et al. |
| 2010/0236612 | A1 | 9/2010 | Khajehoddin et al. |
| 2010/0263704 | A1 | 10/2010 | Fornage et al. |
| 2010/0283325 | A1 | 11/2010 | Marcianesi et al. |
| 2010/0309695 | A1 | 12/2010 | Fornage |
| 2011/0012429 | A1 | 1/2011 | Fornage |
| 2011/0019444 | A1 | 1/2011 | Dargatz et al. |
| 2011/0026281 | A1 | 2/2011 | Chapman et al. |
| 2011/0026282 | A1 | 2/2011 | Chapman et al. |
| 2011/0043160 | A1 | 2/2011 | Serban |
| 2011/0049990 | A1 | 3/2011 | Amaratunga et al. |
| 2011/0051820 | A1 | 3/2011 | Fornage |
| 2011/0130889 | A1 | 6/2011 | Khajehoddin et al. |

FOREIGN PATENT DOCUMENTS

| | | |
|---|---|---|
| CA | 2655007 A1 | 8/2010 |
| CA | 2693737 A1 | 8/2010 |
| DE | 20012131 U1 | 3/2001 |
| EP | 1794799 A1 | 6/2007 |
| EP | 1803161 A1 | 7/2007 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |

| GB | 2454389 A | 5/2009 |
|---|---|---|
| GB | 2455753 A | 6/2009 |
| GB | 2455755 A | 6/2009 |
| NL | 1021582 C2 | 4/2004 |
| NL | 1021591 C2 | 4/2004 |
| WO | WO 2004008619 A2 | 1/2004 |
| WO | WO 2004100348 A1 | 11/2004 |
| WO | WO 2004100348 A8 | 12/2005 |
| WO | WO 2006048688 A1 | 5/2006 |
| WO | WO 2007080429 A2 | 7/2007 |
| WO | WO 2009081205 A2 | 7/2009 |
| WO | WO 2009081205 A3 | 10/2009 |
| WO | WO 2009134756 A1 | 11/2009 |

OTHER PUBLICATIONS

Kwon et al., "High-efficiency Module-integrated Photovoltaic Power Conditioning System," IET Power Electronics, doi: 10.1049/iet-pel.2008.0023, 2008.

Lohner et al., "A New Panel-integratable Inverter Concept for Grid-Connected Photovoltaic Systems," IEEE ISIE '96, vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

Nikraz et al., "Digital Control of a Voltage Source Inverter in Photovoltaic Applications," 35th Annual IEEE Power Electronics Specialists Conference, pp. 3266-3271, 2004.

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995-Dec. 31, 1996," NREL/SR-520-23432, UC Category 1280, 1997, 31 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

Sen et al., "A New DC-to-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l. Conf. Power Electronics, vol. 1, pp. 559-564, 1996.

Takahashi et al., "Electrolytic Capacitor-Less PWM Inverter", in Proceedings of the IPEC '90 Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A 1ω 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.

Wu, et al., "A 1ω 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

Written Opinion of the International Searching Authority, International Application No. PCT/US2011/055687, dated Feb. 1, 2012, 4 pages.

Ando et al., "Development of Single Phase UPS Having AC Chopper and Active Filter Ability," IEEE International Conference on Industrial Technology, 10.1109/ICIT.2006.372445, pp. 1498-1503, 2006.

Biel et al., "Sliding-Mode Control Design of a Boost-Buck Switching Converter for AC Signal Generation," vol. 51, issue 8, pp. 1539-1551, 2004.

Biel et al., "Sliding-Mode Control of a Single-Phase AC/DC/AC Converter," Proceedings of the 40th IEEE Conference on Decision and Control, vol. 1., pp. 903-907, Dec. 2001.

Bose et al., "Electrolytic Capacitor Elimination in Power Electronic System by High Frequency Filter," Conference Record of the 1991 IEEE Industry Applications Society Annual Meeting, vol. 1, pp. 869-878, 1991.

Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block—Ultimate Plug-n-Play That Brings Photovoltaics Directly to the Customer," Proceedings of the National Center for Photovoltaics (NCPV) and Solar Program Review Meeting, pp. 311-314, May 2003.

Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.

Brekken, "Utility-Connected Power Converter for Maximizing Power Transfer From a Photovoltaic Source," Thesis Submitted to the Faculty of the Graduate School of the University of Minnesota, Jun. 2002, 56 pages.

Bush, "UK Solar Firm Discloses Novel Inverter Topology," ElectronicsWeekly.com. Apr. 2011, last accessed Aug. 30, 2011 at http://www.electronicsweekly.com/Articles/2011/04/26/50953/UK-solar-firm-discloses-novel-inverter-topology.htm.

Chang et al., "The Impact of Switching Strategies on Power Quality for Integral Cycle Controllers," IEEE Transactions on Power Delivery, vol. 18, No. 3, pp. 1073-1078, Jul. 2003.

Chisenga, "Development of a Low Power Photovoltaic Inverter for Connection to the Utility Grid," PhD Thesis, Fitzwilliam College, Cambridge, 173 pages, 2007.

Di Napoli et al., "Multiple-Input DC-DC Power Converter for Power-Row Management in Hybrid Vehicles," Conference Rec. IEEE Industrial Applications Soc. Annual Meeting, pp. 1578-1585, 2002.

Edelmoser, "Improved 2kw Solar Inverter With Wide Input Voltage Range," IEEE 10th Mediterranean Conference, MEleCon 2000, vol. 2, pp. 810-813, 2000.

Enphase Energy, "Application Note: Multi-Tenant Design Guidelines," rev. 1, 5 pages, 2008.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Esram et al., "Comparison of Photovoltaic Array Maximum Power Point Tracking Techniques," IEEE Transactions on Energy Conversion, vol. 22, No. 2, pp. 439-449, Jun. 2007.

Henze et al., "A Novel AC Module with High Voltage Panels in CIS Technology," 23rd European Photovoltaic Solar Energy Conference, Valencia, Spain, ISBN 3-936338-24-8, 8 pages, Sep. 2008.

Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.

Hung et al., "Analysis and Implementation of a Delay-compensated Deadbeat Current Controller for Solar Inverters," IEEE Proceedings—Circuits, Devices and Systems, pp. 279-286, 2001.

Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.

Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.

Jeong et al., "An Improved Method for Anti-Islanding by Reactive Power Control," pp. 965-970, 2005.

Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.

Jung et al., "High-frequency DC Link Inverter for Grid-Connected Photovoltaic System," Conference Record of the Twenty-Ninth IEEE Photovoltaic Specialists Conference, pp. 1410-1413, 2002.

Kern, "SunSine300: Manufacture of an AC Photovoltaic Module, Final Report, Phases I & II, Jul. 25, 1995-Jun. 30, 1998," NREL/SR-520-26085, 1999, 32 pages.

Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.

Khajehoddin et al., "A Novel Topology and Control Strategy for Maximum Power Point Trackers and Multi-string Grid-connected PV Inverters," Applied Power Electronics Conference, APEC08, pp. 173-178, 2008.

Khajehoddin et al., "A Robust Power Decoupler and Maximum Power Point Tracker Topology for a Grid-Connected Photovoltaic System," IEEE Power Electronics Specialists Conference, PESC08, pp. 66-69, 2008.

Kim et al., "New Control Scheme for AC-DC-AC Converter Without DC Link Electrolytic Capacitor," 24th Annual IEEE Power Electronics Specialists Conference, PESC '93 Record., pp. 300-306, 1993.

Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected inverters for Photovoltaic Modules," IEEE Trans on Power Electronics, vol. 41, No. 5, pp. 1292-1306, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the Photoenergy™ Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

* cited by examiner

APPARATUS AND METHOD FOR CONTROLLING A POWER INVERTER

TECHNICAL FIELD

The present disclosure relates, generally, to power converters for converting direct current (DC) power to alternating current (AC) power and, more particularly, to apparatuses and methods for controlling the power converters.

BACKGROUND

Power inverters convert a DC power to an AC power. Some power inverters are configured to convert the DC power to an AC power suitable for supplying energy to an AC grid and, in some cases, an AC load coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency.

The amount of power that can be delivered by certain alternative energy sources, such as photovoltaic cells ("PV cells" or "solar cells"), may vary in magnitude over time owing to temporal variations in operating conditions. For example, the output of a typical PV cell will vary with variations in sunlight intensity, angle of incidence of sunlight, ambient temperature and other factors. Additionally, photovoltaic cells have a single operating point at which the values of the current and voltage of the cell result in a maximum power output. This "maximum power point" ("MPP") is a function of environmental variables, including light intensity and temperature. Inverters for photovoltaic systems typically comprise some form of maximum power point tracking ("MPPT") as a means of finding and tracking the maximum power point ("MPP") and adjusting the inverter to exploit the full power capacity of the cell at the MPP. Extracting maximum power from a photovoltaic cell requires that the cell operate continuously at its MPP; fluctuations in power demand, caused, for example, by double-frequency ripple power being reflected back into the cell, will compromise the ability of the inverter to deliver the cell's maximum power.

An important parameter used to measure the performance of alternative energy source inverters is the efficiency of the inverter. Efficiency is typically defined as the ratio of output power from the inverter to input power to the inverter. Although at first glance, improvement of efficiency appears to be a straightforward, improving or otherwise controlling the efficiency of alternative energy source inverters can be complicated. Such complications occur because the efficiency of the inverter may vary with the output power from the inverter (e.g., the efficiency may decrease as the output power decreases). Additionally, some measurement protocols weight the efficiencies of inverters measurements based on the percentage of the rated power. For example, some measurement protocols apply a significant weight to the efficiency of the inverter at light loads, which as discussed above may be at the inverter's lower efficiency end. Accordingly, improving or otherwise controlling efficiency is an important consideration in alternative energy source inverters.

SUMMARY

According to one aspect, a method for controlling an inverter having an input converter coupled to an output converter via a direct current (DC) bus and configured to deliver power from a DC alternative energy source to an alternating current (AC) grid at a grid voltage and a grid phase may include determining a first amount of power being supplied by the DC alternative energy source. Additionally, the method may include in response to the first amount of power being less than a predetermined amount of power: (i) disabling the output converter of the inverter, (ii) in response to the AC grid voltage crossing zero volts, determining an estimated DC bus voltage for a future zero-crossing of the AC grid voltage and determining minimum DC bus voltage, and (iii) in response to the estimated DC bus voltage being greater than a predetermined maximum DC bus voltage, enabling the output converter of the inverter to transfer energy from the DC bus to the AC grid such that the DC bus voltage is reduced to approximately the minimum DC bus voltage.

In some embodiments, determining the estimated DC bus voltage may include, in response to a rising zero-crossing of the AC grid voltage, determining an estimated DC bus voltage for the next rising zero-crossing of the AC grid voltage. Additionally, determining the minimum DC bus voltage may include determining a minimum DC bus voltage in response to the rising zero-crossing of the AC grid voltage. Alternatively, in some embodiments, determining the estimated DC bus voltage may include, in response to a falling zero-crossing of the AC grid voltage, determining an estimated DC bus voltage for the next falling zero-crossing of the AC grid voltage.

Additionally, in some embodiments, determining the estimated DC bus voltage may include determining the estimated DC bus voltage based on the present DC bus voltage and the first amount of power. Further, in some embodiments, the DC bus may include a DC bus capacitor. In such embodiments, determining the estimated DC bus voltage may include determining an estimated DC bus voltage based on the present DC bus voltage, the first amount of power, a capacitance value of the DC bus capacitor, and a line frequency of the AC grid. For example, determining the estimated DC bus voltage may include determining the estimated DC bus voltage according to the following equation: $V_{bus\_next} = [(V_{bus})^2 + (2*P_S)/(C_{bus}*f_{line})]^{1/2}$, wherein $V_{bus\_next}$ is the estimated DC bus voltage, $V_{bus}$ is the present DC bus voltage, $P_S$ is the first amount of power, $C_{bus}$ is the capacitance of the DC bus capacitor, and $f_{line}$ is the line frequency of the AC grid.

Additionally, in some embodiments, the minimum DC bus voltage may be determined such that the minimum DC bus voltage is greater than each of (i) the AC grid voltage and (ii) the voltage of the DC alternative energy source. For example, the minimum DC bus voltage may be determined such that the minimum DC bus voltage is greater than the maximum of (i) the AC grid voltage and (ii) the voltage of the DC alternative energy source by a predetermined voltage margin. In some embodiments, determining the minimum DC bus voltage may include determining the minimum DC bus voltage according to the following equation: $V_{bus\_min} = \max[(\sqrt{2}*V_{line\_rms}), nV_S] + V_{margin}$, wherein $V_{bus\_min}$ is the minimum DC bus voltage, $V_{line\_rms}$ is the root-mean-square voltage of the AC grid, n is the turn ratio of a transformer of the input converter, $V_S$ is the voltage of the alternative energy source, and $V_{margin}$ is the predetermined voltage margin.

Additionally, in some embodiments, enabling the output converter to transfer energy from the DC bus to the AC grid may include determining a second amount of power required to be transferred from the DC bus to the AC grid to reduce the DC bus voltage to approximately the minimum DC bus voltage. Additionally, determining the second amount of power may include determining a second amount of power required to be transferred from the DC bus to the AC grid based on the present DC bus voltage and the minimum DC bus voltage. Further, in some embodiments, the DC bus may include a DC bus capacitor. In such embodiments, determining the second amount of power may include determining a second amount of power required to be transferred from the DC bus to the AC grid based on the present DC bus voltage, the minimum DC bus voltage, a capacitance value of the DC bus capacitor, and a line frequency of the AC grid. For example, in some embodiments, determining the second amount of power may include determining the second amount of power according to the following equation: $P_{jog}=0.5*C_{bus}*[(V_{bus})^2-(V_{bus\_min})^2]*f_{line}$, wherein $P_{jog}$ is the second amount of power, $C_{bus}$ is the capacitance of the DC bus capacitor, $V_{bus}$ is the present DC bus voltage, $V_{bus\_min}$ is the minimum DC bus voltage, and $f_{line}$ is the line frequency of the AC grid.

Further, in some embodiments, enabling the output converter of the inverter to transfer energy from the DC bus to the AC grid may include determining an output current of the output converter based on the first amount of power and the second amount of power. Additionally, the method may further include enabling the output converter in response to the first amount of power being greater than the predetermined amount of power in some embodiments.

According to another aspect, an inverter to deliver power from a direct current (DC) alternative energy source to an alternating current (AC) grid at a grid voltage and a grid phase may include an input converter electrically coupled to the DC alternative energy source, an output converter electrically coupled to the AC grid, a DC bus coupled to the input converter and the output converter, and a control circuit electrically coupled to the input converter and the output converter. The control circuit may be configured to determine a first amount of power being supplied by the DC alternative energy source and, in response to the first amount of power being less than a predetermined amount of power, (i) disable the output converter, (ii) in response to the AC grid voltage crossing zero volts, determine an estimated DC bus voltage for a future zero-crossing of the AC grid voltage and determine minimum DC bus voltage, and (iii) in response to the estimated DC bus voltage being greater than a predetermined maximum DC bus voltage, enable the output converter of the inverter to transfer energy from the DC bus to the AC grid such that the DC bus voltage is reduced to approximately the minimum DC bus voltage.

In some embodiments, to determine the estimated DC bus voltage may include, in response to a rising zero-crossing of the AC grid voltage, to determine an estimated DC bus voltage for the next rising zero-crossing of the AC grid voltage. Alternatively, in some embodiments, to determine the estimated DC bus voltage may include, in response to a falling zero-crossing of the AC grid voltage, to determine an estimated DC bus voltage for the next falling zero-crossing of the AC grid voltage.

In some embodiments, the DC bus may include a DC bus capacitor. In such embodiments, to determine the estimated DC bus voltage may include to determine an estimated DC bus voltage based on the present DC bus voltage, the first amount of power, a capacitance value of the DC bus capacitor, and a line frequency of the AC grid. For example, in some embodiments, to determine the estimated DC bus voltage may include to determine the estimated DC bus voltage according to the following equation: $V_{bus\_next}=[(V_{bus})^2+(2*P_S)/(C_{bus}*f_{line})]^{1/2}$, wherein $V_{bus\_next}$ is the estimated DC bus voltage, $V_{bus}$ is the present DC bus voltage, $P_S$ is the first amount of power, $C_{bus}$ is the capacitance of the DC bus capacitor, and $f_{line}$ is the line frequency of the AC grid.

Additionally, in some embodiments, the minimum DC bus voltage may be determined such that the minimum DC bus voltage is greater than the maximum of (i) the AC grid voltage and (ii) the voltage of the DC alternative energy source by a predetermined voltage margin. For example, in some embodiments, to determine the minimum DC bus voltage may include to determine the minimum DC bus voltage according to the following equation: $V_{bus\_min}=\max[(\sqrt{2}*V_{line\_rms}), nV_S]+V_{margin}$, wherein $V_{bus\_min}$ is the minimum DC bus voltage, $V_{line\_rms}$ is the root-mean-square voltage of the AC grid, n is the turn ratio of a transformer of the input converter, $V_S$ is the voltage of the alternative energy source, and $V_{margin}$ the predetermined voltage margin.

In some embodiments, to enable the output converter to transfer energy from the DC bus to the AC grid may include to determine a second amount of power required to be transferred from the DC bus to the AC grid to reduce the DC bus voltage to approximately the minimum DC bus voltage. For example, to determine the second amount of power may include to determine a second amount of power required to be transferred from the DC bus to the AC grid based on the present DC bus voltage, the minimum DC bus voltage, a capacitance value of the DC bus capacitor, and a line frequency of the AC grid. For example, in some embodiments, to determine the second amount of power may include to determine the second amount of power according to the following equation: $P_{jog}=0.5*C_{bus}*[(V_{bus})^2-(V_{bus\_min})^2]*f_{line}$, wherein $P_{jog}$ is the second amount of power, $C_{bus}$ is the capacitance of the DC bus capacitor, $V_{bus}$ is the present DC bus voltage, $V_{bus\_min}$ is the minimum DC bus voltage, and $f_{line}$ is the line frequency of the AC grid. Additionally, in some embodiments, to enable the output converter of the inverter to transfer energy from the DC bus to the AC grid may include to determine an output current of the output converter based on the first amount of power and the second amount of power.

According to a further aspect, an apparatus may include a solar panel comprising a solar cell configured to generate a first direct current (DC) waveform in response to receiving an amount of sunlight and an inverter coupled to the solar cell panel and configured to receive the first DC waveform and convert the first DC waveform to an output alternating current (AC) waveform supplied to an AC grid. The inverter may include an input converter electrically coupled the solar cell and a DC bus. The input converter may be configured to convert the first DC waveform to a second DC waveform supplied to the DC bus. The inverter may also include an output converter electrically coupled to the DC bus and configured to convert the second DC waveform to the output AC waveform at an AC grid voltage and frequency. The inverter may further include a control circuit electrically coupled to the input converter and the output converter, the control circuit to: determine a first amount of power being supplied by the DC alternative energy source and, in response to the first amount of power being less than a predetermined amount of power, (i) disable the output converter, (ii) in response to the AC grid voltage crossing zero volts, determine an estimated DC bus voltage for a future zero-crossing of the AC grid voltage and determine minimum DC bus voltage, and (iii) in response to the estimated DC bus voltage being greater than a predetermined maximum DC bus voltage, enable the output converter of the inverter to transfer energy from the DC bus to the AC grid such that the DC bus voltage is reduced to approximately the minimum DC bus voltage.

DETAILED DESCRIPTION

Figure 1:
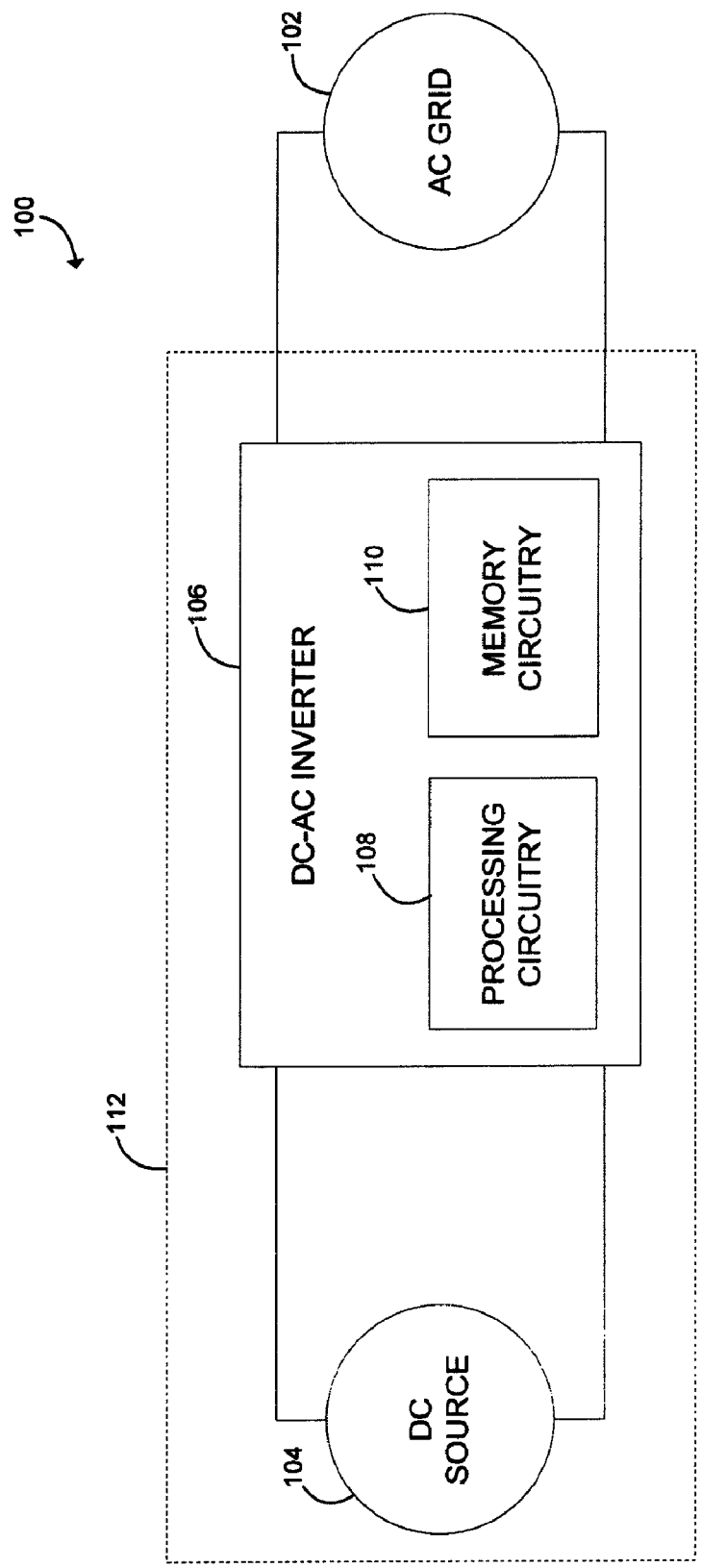
FIG. 1 is a simplified block diagram of one embodiment a system for converting DC power to AC power.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring to FIG. 1, a system 100 for supplying alternating current (hereinafter "AC") power to an AC grid 102 at a grid frequency includes a direct current (hereinafter "DC") source 104 and an inverter 106. The DC source 104 may be embodied as any type of DC source configured to generate or produce a DC power, which is supplied to the inverter 106. For example, the DC power may be embodied as a photovoltaic solar cell or array, a fuel cell, a wind turbine configured to generate a DC power (e.g., via a rectifying circuit), a water turbine configured to generate a DC power, or other unipolar power source.

The inverter 106 is electrically connected to the DC source 104 and configured to convert a DC waveform generated by the DC source 104 to an AC waveform suitable for delivery to the AC grid 102 and, in some embodiments, loads coupled to the AC grid 102. The AC grid may be embodied as, for example, a utility power grid that supplies utility AC power to residential and commercial users. Such utility power grids may be characterized as having an essentially sinusoidal bipolar voltage at a fixed grid frequency (e.g., $f=\omega/2\pi=50$ Hz or 60 Hz).

The inverter 106 includes a plurality of circuits to facilitate the conversion of the DC power to the AC power as discussed in more detail below. In some embodiments, the inverter 106 may include one or more processing circuits 108 and one or more memory circuits 110. The processing circuit 108 may be embodied as any type of processor and associated circuitry configured to perform one or more of the functions described herein. For example, the processing circuit 108 may be embodied as or otherwise include a single or multi-core processor, an application specific integrated circuit, a collection of logic devices, or other circuits. The memory circuits 110 may be embodied as read-only memory devices and/or random access memory devices. For example, the memory circuit 110 may be embodied as or otherwise include dynamic random access memory devices (DRAM), synchronous dynamic random access memory devices (SDRAM), double-data rate dynamic random access memory devices (DDR SDRAM), and/or other volatile or non-volatile memory devices. The memory circuits 108 may have stored therein a plurality of instructions for execution by the processing circuits to control particular functions of the inverter as discussed in more detail below.

Figure 2:
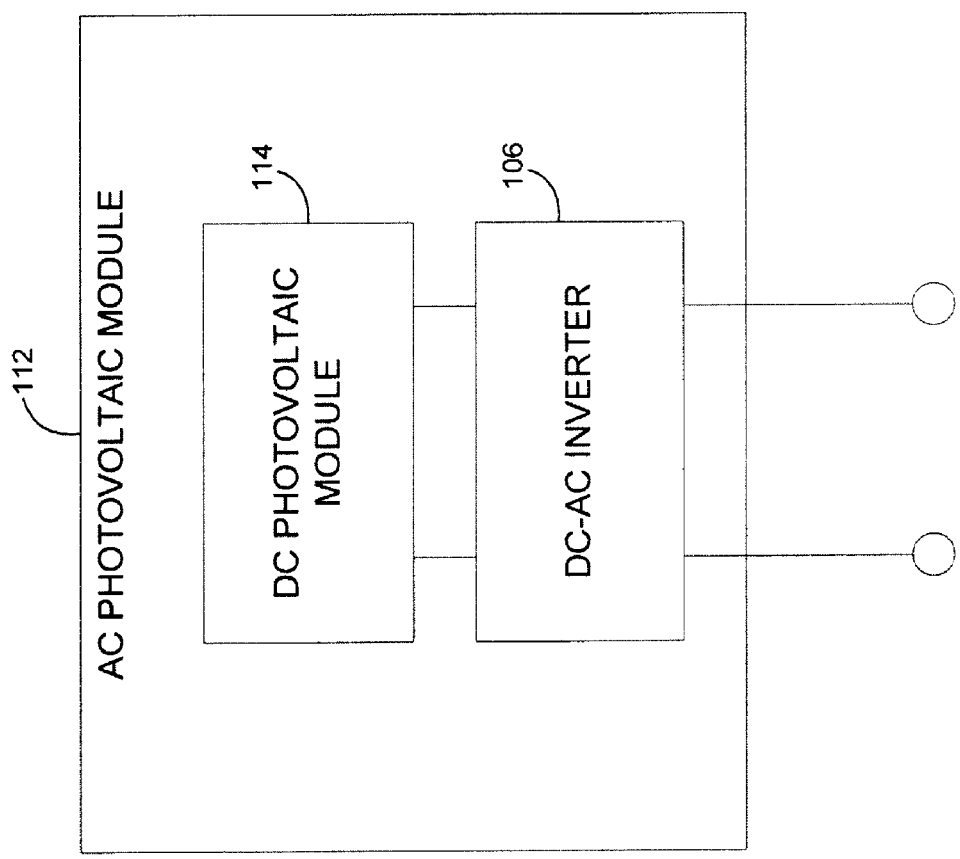
FIG. 2 is a simplified block diagram one embodiment of an AC photovoltaic module of the system of FIG. 1.

As discussed above, in some embodiments, the DC source 104 may be embodied as one or more photovoltaic cells. In such embodiments, the DC source 104 and the inverter 106 may be associated with each other to embodied an AC photovoltaic module (ACPV) 112 as illustrated in FIG. 2. The ACPV 112 includes a DC photovoltaic module (DCPV) 114, which operates as the DC source 104, electrically coupled to the inverter 106. The DCPV 114 includes one or more photovoltaic cells and is configured to deliver a DC waveform to the inverter 106 in response to receiving an amount of sunlight. The DC power delivered by the ACPV 112 is a function of environmental variables, such as, e.g., sunlight intensity, sunlight angle of incidence and temperature. In some embodiments, the inverter 106 is positioned in a housing 116 of the ACPV 112. Alternatively, the inverter 106 may include its own housing 118 secured to the housing 116 of the ACPV 112. Additionally, in some embodiments, the inverter 106 is separate from the housing 116, but located near the DCPV 114. As discussed above, the inverter 106 is configured to convert the DC power received from the DCPV 114 to an AC power suitable for delivery to the AC grid 102 at the grid frequency. It should be appreciated that multiple ACPVs 112 may be used to form a solar array with each ACPV 112 having a dedicated inverter 106.

Figure 3:
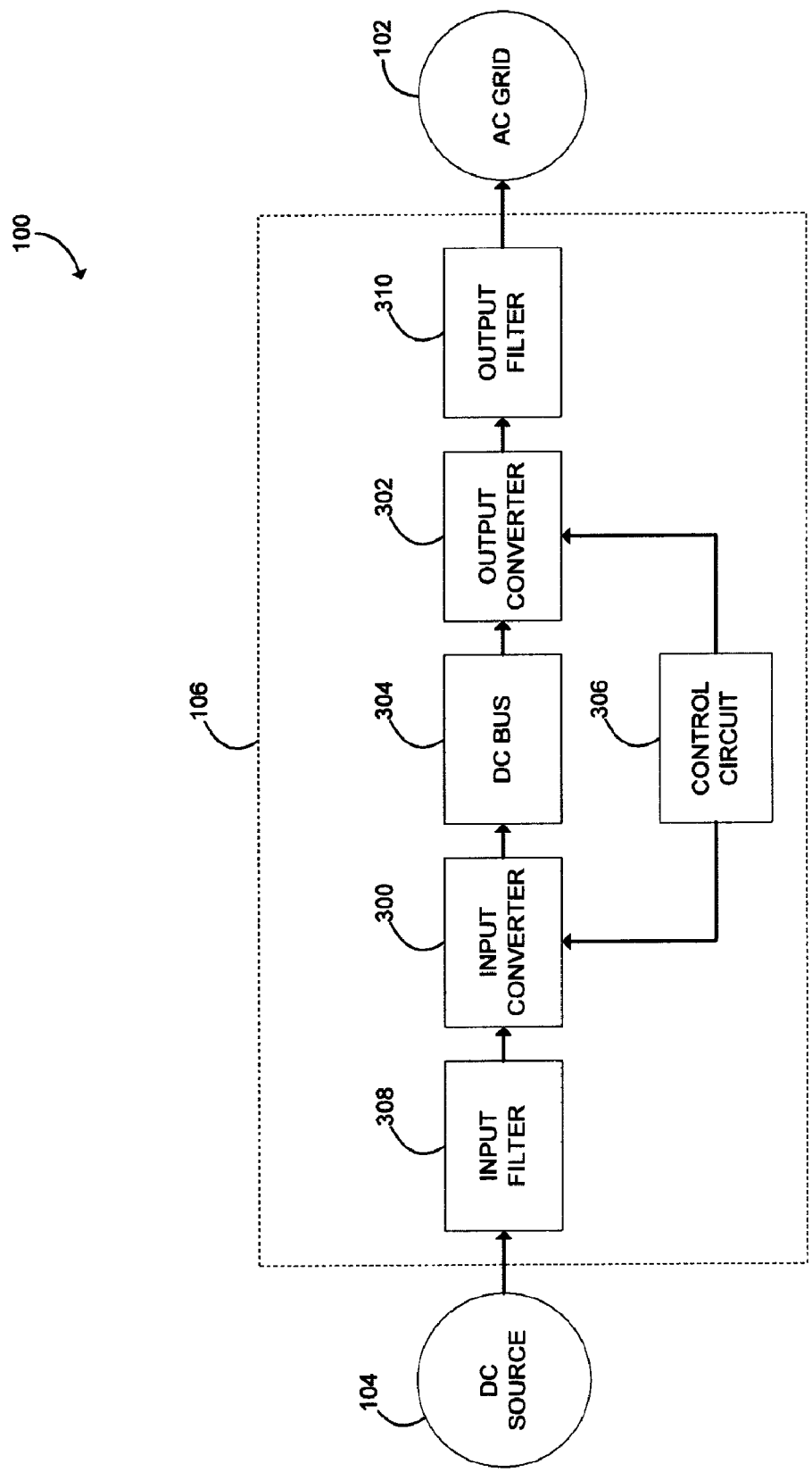
FIG. 3 is a simplified block diagram of one embodiment of an inverter of the system of FIG. 1.

Referring now to FIG. 3, in one illustrative embodiment, the inverter 106 includes an input converter 300 electrically coupled to a DC bus 304, an output converter 302 electrically coupled to the DC bus 304, and a control circuit 306 electrically coupled to the input converter 300 and the output converter 302. Additionally, in some embodiments, the inverter 106 may also include an input filter 308 electrically coupled to the input converter 300 and the DC source 104 and an output filter 310 electrically coupled to the output converter 302 and the AC grid 102.

In the illustrative embodiment, the input converter 300 is embodied as a DC-to-DC converter configured to convert low voltage DC power to high voltage DC power. That is, the input converter 300 converts the DC power received from the DC source 104 to a high level DC voltage power, which is supplied to the DC bus 304. The output converter 302 is embodied as a DC-to-AC converter configured to convert the high voltage DC power from the DC bus 304 to AC power, which is supplied to the AC grid 102 at the grid frequency.

The control circuit 306 is electrically coupled to the input converter 300 and configured to control the operation of the input converter 300 to convert the low voltage DC power received from the DC source 104 to the high voltage DC power supplied to the DC bus 304. Additionally, in some embodiments, the control circuit 306 may control the operation of the input converter based on a maximum power point tracking ("MPPT") algorithm or methodology. For example, the control circuit 306 may include an MPPT control circuit configured to execute an MPPT algorithm such as the MPPT algorithm described in U.S. Patent Publication No. 2008/018338, entitled "Ripple Correlation Control Based on Limited Sampling" by Jonathan W. Kimball et al, which is incorporated herein by reference. To do so, the control circuit 306 may provide a plurality of control signals to various circuits of the input converter 300.

As discussed above, the single-phase power output of the inverter 106 includes an average component and a time-varying component due to variations in the DC source 104 and/or demands of the AC grid 102. The time-varying component has a frequency substantially equal to twice the output AC waveform (i.e., the grid frequency). Without filtering, such double-frequency power ripple must be supplied by the DC source 104 (i.e., the double frequency ripple power propagates back and forth between the AC grid 102 and the DC source 104). Such demands on the DC source 104 can result in failure or lower performance of the DC source 104 and inverter 106. As such, the input filter 308 is configured to filter the double-frequency power ripple on the low voltage bus from the DC source 104. Similarly, the output filter 310 is configured to filter the AC power supplied by the output converter 302 prior to being received by the AC grid 102.

The control circuit 306 is also electrically coupled to the output converter 302 and configured to control operation of the output converter 302 to convert the DC power of the DC bus to AC power suitable for delivery to the AC grid 102. Additionally, as discussed in more detail below in regard to FIG. 6, the control circuit 306 is configured to control the operation of the output converter 302 to improve the efficiency of the inverter 106. In particular, the control circuit 306 is configured to disable the output converter 302 for periods of time during which the DC power generated by the DC source 104 is below a threshold level.

Figure 4:
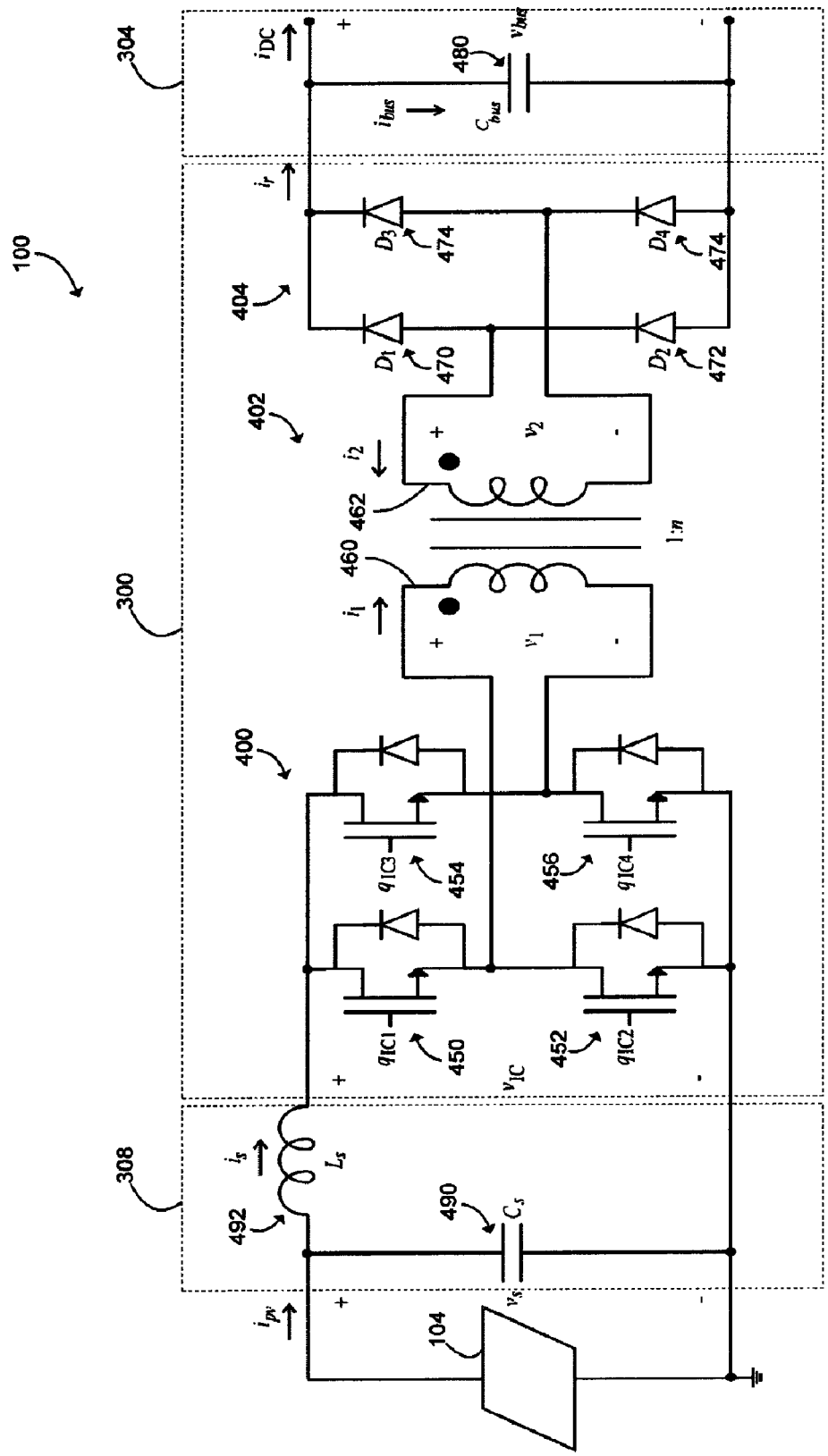
FIGS. 4 and 5 are simplified schematic diagrams of the inverter of FIG. 3.
Figure 5:
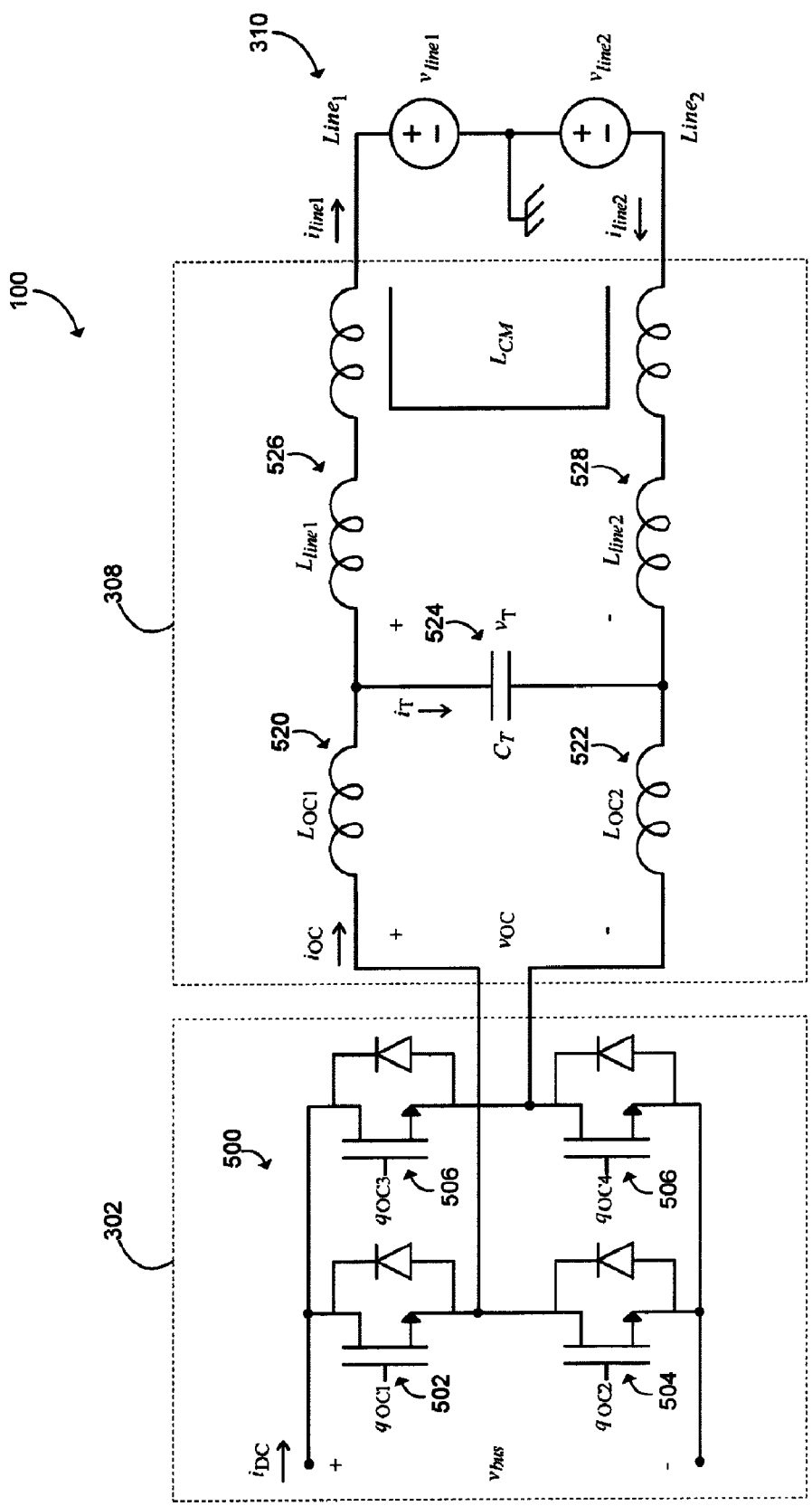

Referring now to FIGS. 4 and 5, in one particular embodiment, the input converter 300 includes an inverter circuit 400, a transformer 402, and a rectifier 404. The inverter circuit 400 is embodied as a DC-to-AC inverter circuit configured to convert the DC waveform supplied by the DC source 104 to an AC waveform delivered to a primary of the transformer 402. For example, the output converter 302 is illustrative embodied as a bridge circuit formed by a plurality of switches 450, 452, 454, 456. Each of the switches 450, 452, 454, 456 are configured to receive a corresponding control signal, $q_{IC1}$, $q_{IC2}$, $q_{IC3}$, $q_{IC4}$, from the control circuit 306 to control operation of the input converter 300. The control circuit may use PWM to control the switches 450, 452, 454, 456 at a relatively high switching frequency (e.g., at a frequency that is substantially higher than the AC grid frequency). As discussed above, output converter 302 converts the DC waveform from the DC source 104 to a first AC waveform based on the control signals received from the control circuit 306. In the illustrative embodiment, the inverter circuit 400 is a embodied as a full-bridge circuit, but other circuit topologies such as a half-bridge circuit may be used in other embodiments. Additionally, although each of the switches 450, 452, 454, 456 is illustrated as MOSFET devices, other types of switches may be used in other embodiments.

The transformer 402 may be embodied as a two or more winding transformer having a primary winding electrically coupled to the inverter circuit 400 and a secondary winding coupled to the rectifier 404. The transformer 402 is configured to convert the first AC waveform supplied by the inverter circuit 400 at the primary winding to a second AC waveform at the secondary winding. The first and second AC waveforms may have substantially equal frequency and may or may not have substantially equal voltages. The illustrative transformer 402 includes a primary winding 460 electrically coupled to the inverter circuit 400 and a secondary winding 462 electrically coupled to the rectifier circuit 404. The transformer 402 provides galvanic isolation between the primary side converter circuitry (including DC source 104) and the secondary side circuitry (including the DC bus 304). The turns ratio of the transformer 402 may also provide voltage and current transformation between the first AC waveform at the primary winding 460 and the second AC waveform at the secondary winding 462.

The rectifier circuit 404 is electrically coupled to the secondary winding 462 of the transformer 402 and is configured to rectify the second AC waveform to a DC waveform supplied to the DC bus 304. In the illustrative embodiment, the rectifier 404 is embodied as a full-bridge rectifier formed from a plurality of diodes 470, 472, 474, 476. Again, in other embodiments, other circuit topologies may be used in the rectifier circuit 404.

The DC bus 304 is coupled to the rectifier circuit 404 of the input converter 300 and to the output converter 302. The DC bus 304 is configured to store energy from the input converter 300 and transfer energy to the output converter 302 as needed. To do so, the DC bus 304 is maintained at a high voltage DC value and includes a DC bus capacitor 480. The particular value of capacitance of the DC bus capacitor 480 is dependent on the particular parameters of the inverter 106 such as the desired voltage level of the DC bus 304, the expected requirements of the AC grid 102, and or the like.

The output converter 302 is electrically coupled to the DC bus 304 and configured to convert the DC bus waveform to the output AC waveform, which is filtered by the output filter 310. The output converter 302 includes a DC-to-AC inverter circuit 500 configured to convert the DC waveform supplied by the DC bus 304 to an AC waveform delivered to the output filter 310. For example, the inverter circuit 500 is illustrative embodied as a bridge circuit formed by a plurality of switches 502, 504, 506, 508. Each of the switches 502, 504, 506, 508 are configured to receive a corresponding control signal, $q_{OC1}$, $q_{OC2}$, $q_{OC3}$, $q_{OC4}$, from the control circuit 306 to control operation of the inverter 106. As discussed above, the control circuit may use PWM to control the switches 502, 504, 506, 508 to generate a pulse width modulated AC waveform. Again, it should be appreciated that although the illustrative the output converter 302 is embodied as a full-bridge circuit, other circuit topologies such as a half-bridge circuit may be used in other embodiments. Additionally, although each of the switches 502, 504, 506, 508 is illustrated as MOSFET devices, other types of switches may be used in other embodiments.

The input filter 308 and output filter 310 are configured to provide filtering functions of the DC input waveform from the DC source 104 and the AC output waveform to the AC grid 102, respectively. The input filter 308 illustratively includes a filtering capacitor 490 and a filtering inductor 492. However, other filtering components and topologies may be used in other embodiments. The output filter 310 is configured to filter the output voltage by reducing the conducted interference and satisfying regulatory requirements. In the illustrative embodiment, the output filter 310 includes differential-mode inductors 520, 522, a line filter capacitor 524, and common-mode inductors 526, 528. Again, however, other filtering component and topologies may be used in other embodiments.

As discussed above, the control circuit 306 controls the operation of the inverter 106. The control circuit 306 includes the processing circuitry 108 and memory circuitry 110 and executes various instructions to effect the control of the inverter 106. For example, the control circuit 306 receives various input signals from components of the inverter 106, such as the input voltage and current from the DC source 104, the line voltage of the AC grid, and other signals, and generates a desired output current, $I_{oc}$. Of course, the output current, $I_{oc}$, is controlled by controlling the duty cycle of the inverter circuit 302 via the control signal, $q_{OC1}$, $q_{OC2}$, $q_{OC3}$, $q_{OC4}$, which are generated using PWM control circuitry. Details of a similar control strategy and inverter topology using an active filter can be found in U.S. patent application Ser. No. 12/563,495, filed on Sep. 21, 2009, entitled "Apparatus and Method for Controlling DC-AC Power Conversion" and in U.S. patent application Ser. No. 12/563,499, filed on Sep. 21, 2009, entitled "Apparatus for Converting Direct Current to Alternating Current," both of which are incorporated herein by reference.

Figure 6:
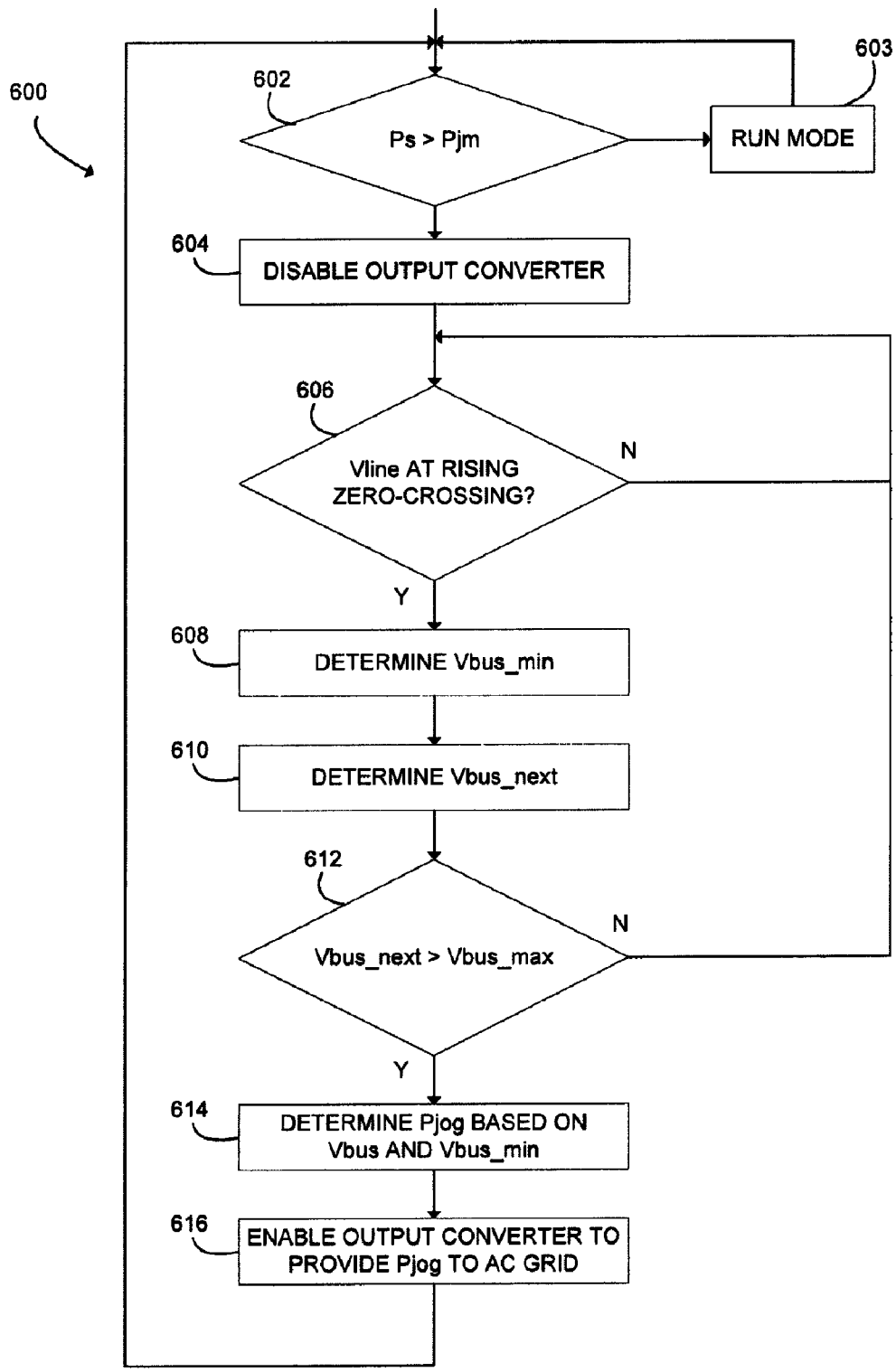
FIG. 6 is a simplified flow diagram of one embodiment of a method for controlling the inverter of FIG. 3.

Referring now to FIG. 6, in one embodiment, the control circuit 306 is configured to disable or otherwise turn off the output converter 302 during periods of time in which the power generated by the DC source 104 is low (e.g., below a predetermined threshold). As such, the overall efficiency of the inverter 106 is improved in the low input power region by selectively turning off the output converter 302. To do so, the control circuit 306 may execute a method 600 for controlling the inverter 106, which may be executed in conjunction with other methods to control other functions of the inverter 106. The method 600 begins with block 602 in which the control circuit 306 determines whether the power generated by the DC source 104, $P_S$, is greater than a predetermined power threshold, $P_{JM}$. The power generated by the DC source 104, $P_S$, is determined based on the voltage of the DC source 104, $V_S$ and the current supplied by the DC source 104, $I_{pv}$. The predetermined power threshold, $P_{JM}$, may be selected based on any suitable criteria and, in one particular embodiment, is set to 67.5 Watts.

If the power generated by the DC source 104, $P_S$, is greater than the predetermined power threshold, $P_{JM}$, the method 600 advances to block 603 in which the inverter 106 is operated in standard or "run mode." In run mode, the output converter 302 is enabled and the inverter 106 operates as normal. However, if the power generated by the DC source 104, $P_S$, is less than the predetermined power threshold, $P_{JM}$, the control circuit 306 enters a "jog mode," and method 600 advances to block 606 in which the control circuit 306 determines whether line voltage of the AC grid, $v_{line}$ ($v_{line}=v_{line1}-v_{line2}$), is at a rising zero-crossing (i.e., the voltage waveform is rising and at approximately zero volts). If not, the method 600 loops back to block 606 until it is determined that the voltage of the AC grid 102 is at a rising zero-crossing. It should be appreciated, however, that in other embodiments other reference points of the voltage of the AC grid 102 may be used. For example, in some embodiments, the falling zero-crossing of the voltage of the AC grid 102 may be used in block 606 (and 610).

If the voltage of the AC grid 102 is determined to be at a rising zero-crossing, the method 600 advances to block 608 in which a minimum value for the voltage of the DC bus 304, $V_{bus\_min}$, is determined. In the illustrative embodiment, the minimum DC bus voltage is determined such that the minimum DC bus voltage is greater than the AC grid voltage and the voltage of the DC source 104. For example, the minimum DC bus voltage may be set equal to the maximum of the average line voltage, $v_{line}$, and the voltage of the DC source 104 as reflected on the secondary side of the transformer 402, $nV_S$ (wherein n is the number of turns of the transformer 402). In one particular embodiment, the minimum DC bus voltage is determined according to the following equation: $V_{bus\_min} = \max[(\sqrt{2}*V_{line\_rms}), nV_S] + V_{margin}$, wherein $V_{bus\_min}$ is the minimum voltage of the DC bus 304, $V_{line\_rms}$ is the root-mean-square voltage of the AC grid 102, n is the turn ratio of a transformer of the input converter, $V_S$ is the voltage of the DC source 104, and $V_{margin}$ is a predetermined voltage margin. Of course, in other embodiments, other algorithms may be used to determine $V_{bus\_min}$. For example, in some embodiments, $V_{bus\_min}$ may be set to a predetermined, constant value.

In block 610, the control circuit 306 estimates or predicts the voltage of the DC bus 304 at the next subsequent rising zero-crossing, $V_{bus\_next}$, of the line voltage, $v_{line}$, of the AC grid 102. The voltage of the DC bus 304 at the next subsequent rising zero-crossing, $V_{bus\_next}$, may be determined based on the present voltage of the DC bus 304, $V_{bus}$, and the power generated by the DC source 104, $P_S$. For example, in one embodiment, the voltage of the DC bus 304 at the next subsequent rising zero-crossing, $V_{bus\_next}$, is determined based on the present voltage of the DC bus 304, $V_{bus}$, the power generated by the DC source 104, $P_S$, the capacitance value of the DC bus capacitor 480, $C_{bus}$, and the line frequency of the AC grid 102, $f_{line}$. In one particular embodiment, the voltage of the DC bus 304 at the next subsequent rising zero-crossing, $V_{bus\_next}$, is determined according to the following equation: $V_{bus\_next} = [(V_{bus})^2 + (2*P_S)/(C_{bus}*f_{line})]^{1/2}$, wherein $V_{bus\_next}$ is the estimated voltage of the DC bus 304 at the next subsequent rising zero-crossing of the line voltage of the AC grid 102, $V_{bus}$ is the present voltage of the DC bus 304, $P_S$ is the amount of power provided by the DC source 104, $C_{bus}$ is the capacitance of the DC bus capacitor, and $f_{line}$ is the line frequency of the AC grid.

After the control circuit 306 has determined the minimum DC bus voltage and estimated the voltage of the DC bus 304 at the next subsequent rising zero-crossing, the method 600 advances to block 612 wherein the control circuit 306 determines whether the estimated/predicted voltage of the DC bus 304 at the next subsequent rising zero-crossing, $V_{bus\_next}$, is greater than a predetermined maximum voltage for the DC bus 304, $V_{bus\_max}$. The predetermined maximum voltage for the DC bus 304, $V_{bus\_max}$, may be set to any suitable value greater than the peak of the line voltage of the AC grid 102, $v_{line}$. For example, in one particular embodiment, the predetermined maximum voltage for the DC bus 304, $V_{bus\_max}$, is set to about 480 volts, but other voltage levels may be used in other embodiments.

If the estimated/predicted voltage of the DC bus 304 at the next subsequent rising zero-crossing, $V_{bus\_next}$, is not greater than a predetermined maximum voltage for the DC bus 304, $V_{bus\_max}$, the method 600 loops back to block 606 to continue monitoring for the next rising zero-crossing of the line voltage of the AC grid 102. If, however, the voltage of the DC bus 304 at next subsequent rising zero-crossing, $V_{bus\_next}$, is greater than a predetermined maximum voltage for the DC bus 304, $V_{bus\_max}$, the method 600 advances to block 614 in which an output power in jog mode, Pjog, is determined. The output power in jog mode, $P_{jog}$, is the power to be supplied from the DC bus 304, in addition to the available power form the DC source 104, $P_S$, to the output converter 302 to reduce the estimated voltage of the DC bus 304 at next subsequent rising zero-crossing, $V_{bus\_next}$, to the minimum DC bus voltage $V_{bus\_min}$, determined in block 608. As such, the output power in jog mode, $P_{jog}$, may be determined based on the current voltage of the DC bus 304, $V_{bus}$, and the minimum DC bus voltage $V_{bus\_min}$. For example, in one embodiment, the output power in jog mode, $P_{jog}$, is determined based on current voltage of the DC bus 304, $V_{bus}$, the minimum DC bus voltage $V_{bus\_min}$, the capacitance value of the DC bus capacitor 480, $C_{bus}$, and the line frequency of the AC grid 102, $f_{line}$. In one particular embodiment, the output power in jog mode, $P_{jog}$, is determined according to the following equation: $P_{jog}=0.5*C_{bus}*[(V_{bus})^2-(V_{bus\_min})^2]*f_{line}$, wherein $P_{jog}$ is the output power in jog mode, $C_{bus}$ is the capacitance of the DC bus capacitor, $V_{bus}$ is the present voltage of the DC bus 304, $V_{bus\_min}$ is the minimum DC bus voltage determine in block 608, and $f_{line}$ is the line frequency of the AC grid 102.

After the control circuit 306 determines the output power in jog mode, $P_{jog}$, the method 600 advances to block 616 in which the output converter 302 is enabled and the output current, $I_{oc}$, from the output converter 302 is controlled to provide the output power in jog mode, $P_{jog}$, determined in block 614. To cause the determined output current, $I_{oc}$, the control circuit 306 may control the duty cycle of the output converter 302 via the control signal, $q_{OC1}$, $q_{OC2}$, $q_{OC3}$, $q_{OC4}$, as discussed above. After the output converter 310 has been enabled and controlled to produce the output power in jog mode, $P_{jog}$, the method 600 loops back to block 602 in which the control circuit 306 again determines whether the power generated by the DC source 104, $P_S$, is greater than a predetermined power threshold, $P_{JM}$. In this way, the control circuit 306 is configured to enter a jog mode if the current output power of the DC source 104 is less than a predetermined power output. In jog mode, the control circuit 306 transfers some energy stored in the DC bus 304 to the AC grid 102 if an estimated voltage level of the DC bus 304 at the next rising zero-crossing of the line voltage of the AC grid 102 is above a determined minimum voltage. The amount of energy transferred is determined such that the voltage of the DC bus 304 is reduced to the determined minimum voltage. In this way, the voltage on the DC bus 304 is maintained between the determined minimum voltage and a predetermined maximum voltage while in jog mode.

Figure 7:
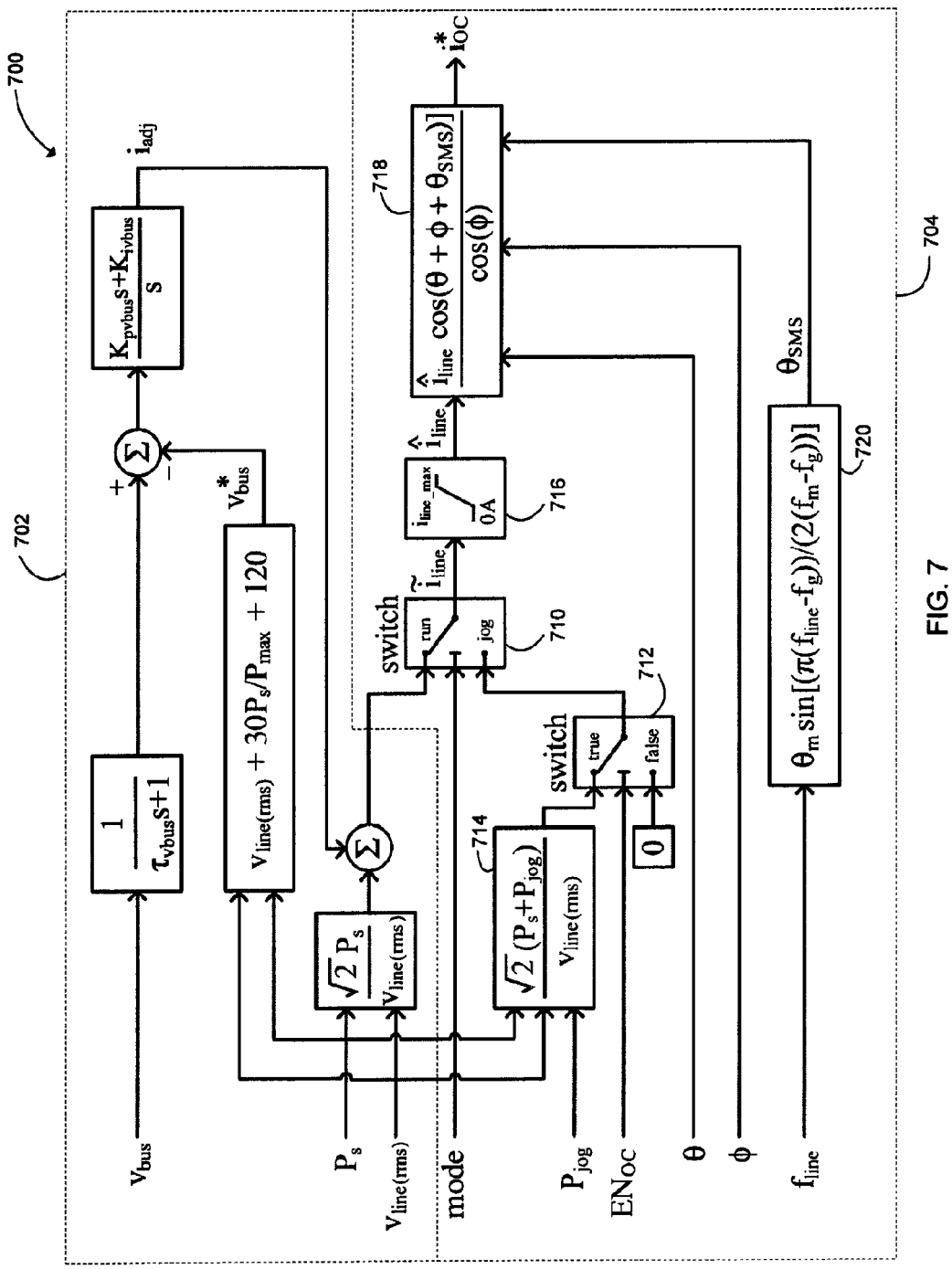
FIG. 7 is a simplified block diagram of a control topology of the inverter of FIG. 3.

Referring now to FIG. 7, one illustrative embodiment of a control topology 700 included in the control circuit 306 is illustrated. The control topology 700 may be implemented in hardware, firmware, or a combination thereof. The illustrative control topology 700 includes a run mode section 702 and a jog mode section 704. The jog mode section 704 implements the control method illustrated in and described above in regard to FIG. 6. For example, the control topology 700 includes a switch 710 controlled by a mode command to switch the control topology 700 between run mode and jog mode. When in jog mode, another switch 712 is controlled by an output converter enable signal, $EN_{oc}$. If the output converter is enabled (see block 616 of method 600), an initial line current, $\tilde{i}_{line}$, is determined based on a calculation block 714. In block 714, $\tilde{i}_{line}$, is determined according to the following equation: $\tilde{i}_{line}=(P_S+P_{jog})v_{line\_rms}$, wherein Ps is the current power generated by the DC power source 104, Pjog is the output power in jog mode as determined in block 616 of method 600, and $v_{line\_rms}$ is the root-mean-square value (RMS value) of the line voltage of the AC grid 102. In block 716, the initial line current, $\tilde{i}_{line}$, is capped at a maximum line voltage, $i_{line\_max}$, to generate a maximum line current, $\hat{i}_{line}$. Subsequently, in block 718, the desired output current of the output converter 302, $i^*_{oc}$, is determined according to the following equation: $i^*_{oc}=[\hat{i}_{line}*\cos(\theta+\phi+\theta_{SMS})]/\cos(\phi)$, wherein $\hat{i}_{line}$ is the maximum line current determined in block 716, $\theta$ is the phase angle of the voltage of the AC grid 102, $\phi$ is the phase difference between the phase of the current delivered to the AC grid 102 and the phase of the AC grid voltage, and $\theta_{SMS}$ is a variable phase shift. The variable phase shift, $\theta_{SMS}$, which is based on a slip-mode shift (SMS) algorithm, is used to create disturbances that help the inverter 106 detect island conditions that may occur from time to time on the AC grid 102. The variable phase shift, $\theta_{SMS}$, is determined in block 720 according to the following equation: $\theta_M*\sin[\pi(f_{line}-f_g))/2(f_m-f_g))]$, wherein $\theta_M$ is the phase amplitude (e.g., 30 degrees), $f_{line}$ is the frequency of the line voltage of the AC grid 102, $f_g$ is a constant equal to the normal value of the grid frequency (e.g., 60 Hz), and $f_m$ is a constant slightly larger than the normal value of the grid frequency (e.g., 62 Hz). As discussed above, the desired output current of the output converter 302, $i^*_{oc}$, is generated by controlling the duty cycle of the output converter 302 via the control signal, $q_{OC1}$, $q_{OC2}$, $q_{OC3}$, $q_{OC4}$.

Figure 8:
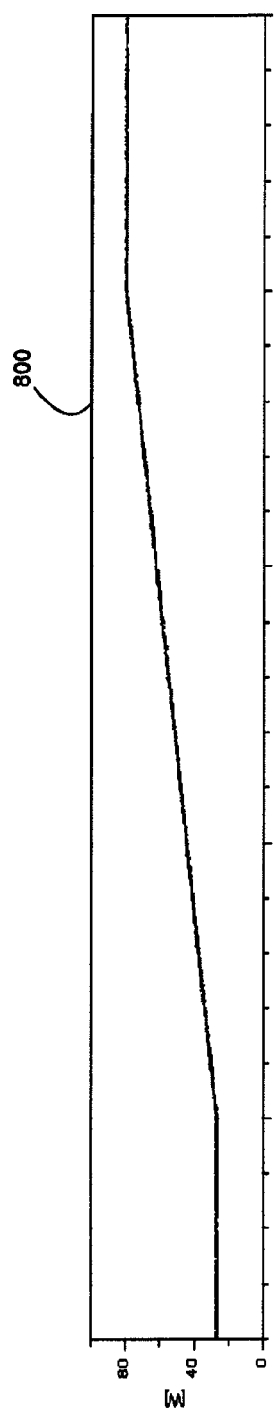
FIGS. 8-10 are simulated waveforms of the inverter of FIG. 3.
Figure 9:
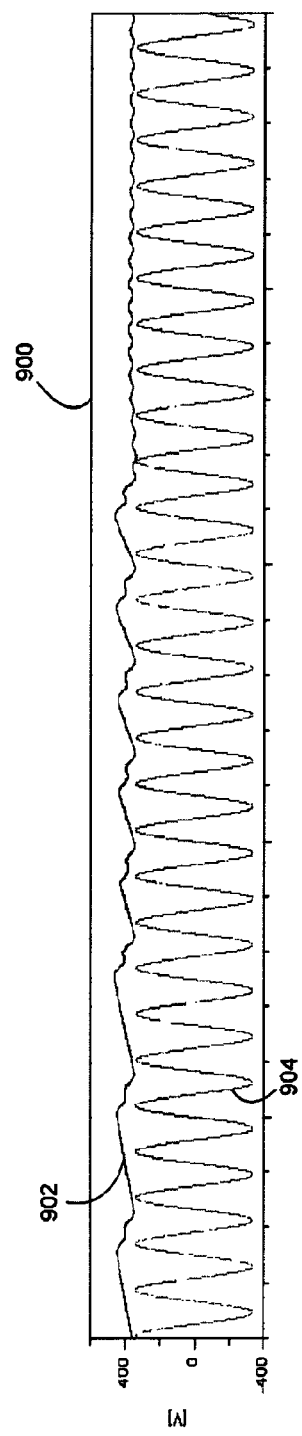
Figure 10:
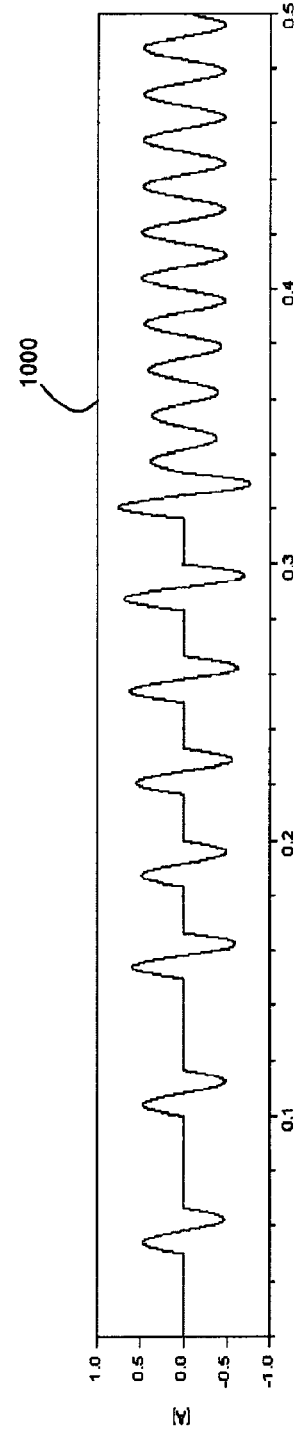

Referring now to FIGS. 8-10, graphs of various signals generated during the execution of the method 600 are illustrated. In the illustrative embodiment of FIGS. 8-10, $V_{bus\_max}$ was set to 480 volts, and the capacitance of the bus capacitor, $C_{bus}$, was set to 23.4 µF. In FIG. 8, a graph 800 illustrates the power generated by the DC power source 104, which increases from an initial value of about 25 Watts to a final value of about 80 Watts. In FIG. 9, a graph 900 of the voltage 902 of the DC bus 304, $V_{bus}$, and of the voltage 904 of the AC grid 102 are illustrated. Additionally, in FIG. 10, a graph 1000 of the current supplied to the AC grid 102 by inverter 106, $i_{line}$, is shown. Based on the graphs 800, 900, 1000, it should be appreciated that the voltage of the DC bus 304, $V_{bus}$, never exceeds the maximum bus voltage, $V_{bus\_max}$, which was set to 480 volts. Additionally, the voltage of the DC bus 304, $V_{bus}$, is always above the peak voltage of the AC grid 102. Additionally, the amount of output current, $i_{line}$, supplied to the AC grid 102 during jog mode depends on the power supplied by the DC power source 104, Ps, which dictates how fast the bus capacitor 480 is discharged.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. A method for controlling an inverter configured to deliver power from a direct current (DC) alternative energy source to an alternating current (AC) grid at a grid voltage and a grid phase, the inverter including an input converter coupled to an output converter via a DC bus, the method comprising:
   determining a first amount of power being supplied by the DC alternative energy source; and
   in response to the first amount of power being less than a predetermined amount of power:
   (i) disabling the output converter of the inverter,
   (ii) in response to the AC grid voltage crossing zero volts, determining an estimated DC bus voltage for a future zero-crossing of the AC grid voltage and determining minimum DC bus voltage, and (iii) in response to the estimated DC bus voltage being greater than a predetermined maximum DC bus voltage, enabling the output converter of the inverter to transfer energy from the DC bus to the AC grid such that the DC bus voltage is reduced to approximately the minimum DC bus voltage.

2. The method of claim 1, wherein determining the estimated DC bus voltage comprises:
in response to a rising zero-crossing of the AC grid voltage, determining an estimated DC bus voltage for the next rising zero-crossing of the AC grid voltage.

3. The method of claim 2, wherein determining the minimum DC bus voltage comprises determining a minimum DC bus voltage in response to the rising zero-crossing of the AC grid voltage.

4. The method of claim 1, wherein determining the estimated DC bus voltage comprises:
in response to a falling zero-crossing of the AC grid voltage, determining an estimated DC bus voltage for the next falling zero-crossing of the AC grid voltage.

5. The method of claim 1, wherein determining the estimated DC bus voltage comprises determining the estimated DC bus voltage based on the present DC bus voltage and the first amount of power.

6. The method of claim 5, wherein the DC bus includes a DC bus capacitor, and
wherein determining the estimated DC bus voltage comprises determining a estimated DC bus voltage based on the present DC bus voltage, the first amount of power, a capacitance value of the DC bus capacitor, and a line frequency of the AC grid.

7. The method of claim 6, wherein determining the estimated DC bus voltage comprises determining the estimated DC bus voltage according to the following equation:

$$V_{bus\_next}=[(V_{bus})^2+(2*P_S)/(C_{bus}*f_{line}]^{1/2}$$

wherein $V_{bus\_next}$ is the estimated DC bus voltage, $V_{bus}$ is the present DC bus voltage, $P_S$ is the first amount of power, $C_{bus}$ is the capacitance of the DC bus capacitor, and $f_{line}$ is the line frequency of the AC grid.

8. The method of claim 1, wherein the minimum DC bus voltage is determined such that the minimum DC bus voltage is greater than each of (i) the AC grid voltage and (ii) the voltage of the DC alternative energy source.

9. The method of claim 8, wherein the minimum DC bus voltage is determined such that the minimum DC bus voltage is greater than the maximum of (i) the AC grid voltage and (ii) the voltage of the DC alternative energy source by a predetermined voltage margin.

10. The method of claim 9, wherein determining the minimum DC bus voltage comprises determining the minimum DC bus voltage according to the following equation:

$$V_{bus\_min}=\max[(\sqrt{2}*V_{line\_rms},nV_S]+V_{margin}$$

wherein $V_{bus\_min}$ is the minimum DC bus voltage, $V_{line\_rms}$ is the root-mean-square voltage of the AC grid, n is the turn ratio of a transformer of the input converter, $V_S$ is the voltage of the alternative energy source, and $V_{margin}$ is the predetermined voltage margin.

11. The method of claim 1, wherein enabling the output converter to transfer energy from the DC bus to the AC grid comprises determining a second amount of power required to be transferred from the DC bus to the AC grid to reduce the DC bus voltage to approximately the minimum DC bus voltage.

12. The method of claim 11, wherein determining the second amount of power comprises determining a second amount of power required to be transferred from the DC bus to the AC grid based on the present DC bus voltage and the minimum DC bus voltage.

13. The method of claim 12, wherein the DC bus includes a DC bus capacitor, and
determining the second amount of power comprises determining a second amount of power required to be transferred from the DC bus to the AC grid based on the present DC bus voltage, the minimum DC bus voltage, a capacitance value of the DC bus capacitor, and a line frequency of the AC grid.

14. The method of claim 13, wherein determining the second amount of power comprises determining the second amount of power according to the following equation:

$$P_{jog}=0.5*C_{bus}*[(V_{bus})^2-(V_{bus\_min})^2]*f_{line}$$

wherein $P_{jog}$ is the second amount of power, $C_{bus}$ is the capacitance of the DC bus capacitor, $V_{bus}$ is the present DC bus voltage, $V_{bus\_min}$ is the minimum DC bus voltage, and $f_{line}$ is the line frequency of the AC grid.

15. The method of claim 11, wherein enabling the output converter of the inverter to transfer energy from the DC bus to the AC grid comprises determining an output current of the output converter based on the first amount of power and the second amount of power.

16. The method of claim 1, further comprising enabling the output converter in response to the first amount of power being greater than the predetermined amount of power.

17. An inverter to deliver power from a direct current (DC) alternative energy source to an alternating current (AC) grid at a grid voltage and a grid phase, the inverter comprising:
an input converter eclectically coupled to the DC alternative energy source;
an output converter electrically coupled to the AC grid;
a DC bus coupled to the input converter and the output converter; and
a control circuit electrically coupled to the input converter and the output converter, the control circuit to:
determine a first amount of power being supplied by the DC alternative energy source; and
in response to the first amount of power being less than a predetermined amount of power:
(i) disable the output converter,
(ii) in response to the AC grid voltage crossing zero volts, determine an estimated DC bus voltage for a future zero-crossing of the AC grid voltage and determine minimum DC bus voltage, and
(iii) in response to the estimated DC bus voltage being greater than a predetermined maximum DC bus voltage, enable the output converter of the inverter to transfer energy from the DC bus to the AC grid such that the DC bus voltage is reduced to approximately the minimum DC bus voltage.

18. The inverter of claim 17, wherein to determine the estimated DC bus voltage comprises:
in response to a rising zero-crossing of the AC grid voltage, determine an estimated DC bus voltage for the next rising zero-crossing of the AC grid voltage.

19. The inverter of claim 17, wherein to determine the estimated DC bus voltage comprises:
in response to a falling zero-crossing of the AC grid voltage, determine an estimated DC bus voltage for the next falling zero-crossing of the AC grid voltage.

20. The inverter of claim 17, wherein the DC bus includes a DC bus capacitor, and
wherein to determine the estimated DC bus voltage comprises to determine a estimated DC bus voltage based on the present DC bus voltage, the first amount of power, a capacitance value of the DC bus capacitor, and a line frequency of the AC grid.

21. The inverter of claim 20, wherein to determine the estimated DC bus voltage comprises to determine the estimated DC bus voltage according to the following equation:

$$V_{bus\_next} = [(V_{bus})^2 + (2*P_S)/(C_{bus}*f_{line})]^{1/2}$$

wherein $V_{bus\_next}$ is the estimated DC bus voltage, $V_{bus}$ is the present DC bus voltage, $P_S$ is the first amount of power, $C_{bus}$ is the capacitance of the DC bus capacitor, and $f_{line}$ is the line frequency of the AC grid.

22. The inverter of claim 17, wherein the minimum DC bus voltage is determined such that the minimum DC bus voltage is greater than the maximum of (i) the AC grid voltage and (ii) the voltage of the DC alternative energy source by a predetermined voltage margin.

23. The inverter of claim 22, wherein to determine the minimum DC bus voltage comprises to determine the minimum DC bus voltage according to the following equation:

$$V_{bus\_min} = \max[(\sqrt{2}*V_{line\_rms}), nV_S] + V_{margin}$$

wherein $V_{bus\_min}$ is the minimum DC bus voltage, $V_{line\_rms}$ is the root-mean-square voltage of the AC grid, n is the turn ratio of a transformer of the input converter, $V_S$ is the voltage of the alternative energy source, and $V_{margin}$ is the predetermined voltage margin.

24. The inverter of claim 17, wherein to enable the output converter to transfer energy from the DC bus to the AC grid comprises to determine a second amount of power required to be transferred from the DC bus to the AC grid to reduce the DC bus voltage to approximately the minimum DC bus voltage.

25. The inverter of claim 24, wherein the DC bus includes a DC bus capacitor, and
to determine the second amount of power comprises to determine a second amount of power required to be transferred from the DC bus to the AC grid based on the present DC bus voltage, the minimum DC bus voltage, a capacitance value of the DC bus capacitor, and a line frequency of the AC grid.

26. The inverter of claim 25, wherein to determine the second amount of power comprises to determine the second amount of power according to the following equation:

$$P_{jog} = 0.5*C_{bus}*[(V_{bus})^2 - (V_{bus\_min})^2]*f_{line}$$

wherein $P_{jog}$ is the second amount of power, $C_{bus}$ is the capacitance of the DC bus capacitor, $V_{bus}$ is the present DC bus voltage, $V_{bus\_min}$ is the minimum DC bus voltage, and $f_{line}$ is the line frequency of the AC grid.

27. The inverter of claim 24, wherein to enable the output converter of the inverter to transfer energy from the DC bus to the AC grid comprises to determine an output current of the output converter based on the first amount of power and the second amount of power.

28. An apparatus comprising:
a solar panel comprising a solar cell configured to generate a first direct current (DC) waveform in response to receiving an amount of sunlight;
an inverter coupled to the solar cell panel and configured to receive the first DC waveform and convert the first DC waveform to an output alternating current (AC) waveform supplied to an AC grid, the inverter comprising:
an input converter electrically coupled the solar cell and a DC bus, the input converter configured to convert the first DC waveform to a second DC waveform supplied to the DC bus;
an output converter electrically coupled to the DC bus and configured to convert the second DC waveform to the output AC waveform at an AC grid voltage and frequency; and
a control circuit electrically coupled to the input converter and the output converter, the control circuit to:
determine a first amount of power being supplied by the DC alternative energy source; and
in response to the first amount of power being less than a predetermined amount of power:
(i) disable the output converter,
(ii) in response to the AC grid voltage crossing zero volts, determine an estimated DC bus voltage for a future zero-crossing of the AC grid voltage and determine minimum DC bus voltage, and
(iii) in response to the estimated DC bus voltage being greater than a predetermined maximum DC bus voltage, enable the output converter of the inverter to transfer energy from the DC bus to the AC grid such that the DC bus voltage is reduced to approximately the minimum DC bus voltage.

* * * * *